June 19, 1951 J. E. SMITH 2,557,319

FACSIMILE RECEIVING SYSTEM

Filed Sept. 14, 1946

INVENTOR
J. E. SMITH
BY H. S. Grover
ATTORNEY

Patented June 19, 1951 2,557,319

UNITED STATES PATENT OFFICE 2,557,319

FACSIMILE RECEIVING SYSTEM

James Ernest Smith, West Roxbury, Mass., assignor to Radio Corporation of America, a corporation of Delaware Application September 14, 1946, Serial No. 697,110

6 Claims. (Cl. 178—6.6)

This invention relates to signalling systems and more particularly to an improved facsimile receiving system.

In the process of development of signalling systems for transmission of images by facsimile, a time modulation method was first put into use. The method is predicated on the idea of synthesizing picture tone values by recording dots of varying duration but of uniform frequency of occurrence.

This particular method, however, has some characteristics which are undesirable. When signal conditions are subnormal, multi-path and selective fading produces streaks in the recorded copy. The screen pattern produced on the received copy is not entirely satisfactory when rescreened for reduction or enlargement by newspapers. Some of the fine detail in the picture is lost, and the time of transmission must be relatively long in order to minimize the effect of multi-path variations on the recorded copy. The development of good quality short wave radio point-to-point program circuits has opened the field of all the various forms of telephonic and tone modulation to facsimile.

Fading, and selective fading in particular, reduces the efficiency of the systems utilizing simple amplitude modulation for facsimile.

Frequency modulation of a subcarrier tone, which in turn may be applied as amplitude modulation to a short wave radio telephone circuit, has become possible and is in extensive operation, both in the United States and throughout the world.

The frequency modulation of a subcarrier tone has increased the speed of operation and has resulted in an improved linear amplitude recording. Usable pictures may be obtained even through poor signal conditions, which minimizes the objectionable streaks caused by multi-path or selective fading. A direct connection to wire line systems at the radio receiving station is possible, and existing standard methods and equipment may be employed for the transmission of facsimile signals.

The design of a transmitting element for subcarrier frequency modulation may be some form of special scanning head having a frequency modulation output. However, it is equally possible, in view of the flexibility of operation of the subcarrier frequency modulation system, to utilize any of existing type scanners and other available terminal equipment.

In the conventional method of detecting subcarrier frequency modulated (here also called "SCFM") radio photo signals, the incoming signal is amplified and limited to reduce the effect of selective fading. It is then converted to an amplitude modulated signal by means of a discriminator, and the detection follows. The detected signal usually actuates a galvanometer or crater lamp recorder either directly or through a D. C. amplifier. The discriminator may be a low pass filter or any other suitable frequency discriminating network. However, in the conventional method of detecting subcarrier frequency modulated signals, it is difficult to obtain linear conversion characteristics for relatively wide frequency shifts. It is also true that a new discriminator must be used each time the mean frequency of the incoming signal wave is shifted more than a few percent.

According to this invention, a substantially linear conversion characteristic of a frequency modulated signal wave is obtained over a wide range of mean frequency values by producing brief duration energy pulses whose frequency of recurrence is governed by the frequency of the incoming signal wave, and the response of the reproducing means is governed in accordance with the repetition rate of the energy pulses.

The primary object of this invention is to provide an improved signalling system.

Another object of this invention is to provide an improved facsimile receiving system.

Still another object of this invention is to obtain substantially linear conversion characteristics for relatively wide frequency shifts in subcarrier frequency modulation.

A further object of this invention is to provide an improved facsimile receiving system operable over a wide range of mean frequency signals without the necessity for readjustment.

Other and incidental objects of the invention will be apparent to those skilled in the art from a reading of the following specification and an inspection of the accompanying drawing in which Figure 1 shows in block diagram a preferred form of this invention;

Figures 2*a*, 2*b*, and 2*c* show diagrammatically the operation of this invention;

Figure 1:
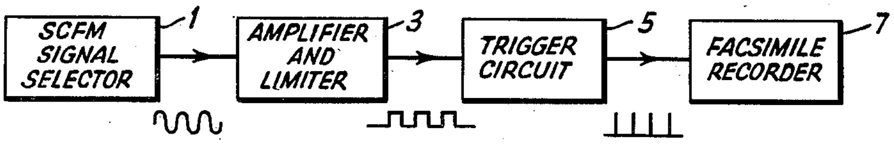

Turning now in more detail to Figure 1, there is shown a subcarrier frequency modulated selector 1 which may or may not be required, depending upon the application of this invention, but in the case of a radio receiving system may take the form of a tunable band pass filter which, for example, might eliminate the frequencies above 4000 cycles and below 1000 cycles. Such action would prevent the second harmonic of the subcarrier frequency and spurious high and low frequencies from passing through to the remainder of the circuit. The output of selector 1 is passed to the amplifier and limiter 3, which may be conventional and provides an output signal having a uniform amplitude regardless of fading and interference.

A great deal of technical information has been published concerning the function and operation of signal limiters. One type of limiter suitable for use in reproducing images is shown and described in an article entitled "Radio facsimile by subcarrier frequency modulation," beginning on page 131 of "RCA Review" for October 1939.

A signal from the amplifier and limiter 3 is passed to the trigger circuit, peaking circuit or multivibrator 5, which produces energy pulses whose frequency of recurrence is controlled by the frequency of the signal obtained from the amplifier and limiter 3 and whose time duration is relatively short with respect to the time recurrence of the energy pulses.

The energy pulses are transmitted to a facsimile recorder 7 whose density of recording is governed by the frequency of recurrence of the pulses obtained from the trigger circuit 5. A photographic recording system of the type suitable for use in the practice of this invention is shown and described in "RCA Review" for July 1938, beginning on page 59, in an article entitled "Photoradio transmission of pictures," by Henry Shore.

Photographic film will linearly record light variations at approximately 4 to 1, or 12 decibels. Optimum contrast, therefore, requires a 4 to 1 change in the light density on the film and correspondingly a 4 to 1 change in the intensity of the signal.

Suppose, for the purpose of illustration, that a light source with a shutter is focused upon an area of film equal to an image element. If the shutter is open for the time of transmission of $^1/_{12}$ of the picture element and the intensity of the light source is properly adjusted, the density of the recording will correspond to 100% black. If the intensity of the light source is reduced to one-half this value, two openings of the shutter will be required to produce 100% black. Similarly, if the intensity of the light source is reduced to one-tenth of the original value, ten openings of the shutter will be required for complete black. Five openings of the shutter will record 50% black. The density of the recording is linearly proportional to the number of openings of the shutter. This arrangement is, in effect, a frequency-to-amplitude converter, since the frequency of operation of the shutter is linearly related to the density of the recording. The film itself serves as the integrating or frequency discriminating element of the system.

The basic detection principle described above can be readily applied in a practical system. As shown and described in Figure 1, the incoming frequency modulated wave is amplified and limited in the usual manner. The resulting square wave output signals are converted into short energy pulses of constant amplitude and duration.

The energy pulses are then utilized to deflect the galvanometer in the facsimile recorder 7. The galvanometer in the facsimile recorder 7 may, for the purpose of explanation, be considered acting as a shutter on the light source, or the energy pulses may be used directly to key a crater lamp on and off.

If, for example, the system was adjusted so that eight swings of the galvanometer were required for complete black, the pulse length time of the trigger circuit is adjusted to approximately $\frac{1}{10}$ of the time of transmission of an image element. This is shown graphically in Figure 2*a*.

Figure 2A:
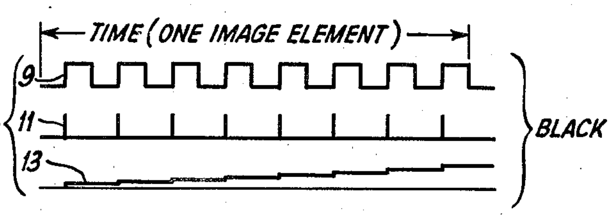

In Figure 2*a*, curve 9 represents the signal applied to the trigger circuit 5 of Figure 1, representative of a "black" element of the image. The trigger circuit 5 of Figure 1 produces a short energy pulse for each of the square waves, as shown by 11 of Figure 2*a*. The resulting recording action for a black element of the image is shown by curve 13 of Figure 2*a*. For the purpose of illustration, let it be assumed that the range of the recording paper is limited to 12 decibels. White would therefore require only two pulses per image element, as shown in Figure 2*c*.

Figure 2B:
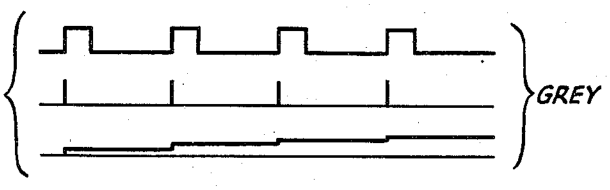
Figure 2C:
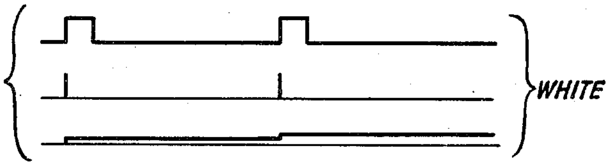

It follows that a gray element of the image is reproduced upon reception of a subcarrier modulated frequency resulting in four energy pulses per image element, as illustrated in Figure 2*b*.

Figure 3:
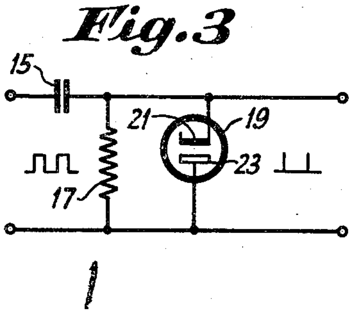
Figure 3 shows a circuit diagram of one form of energy pulse generator employed in the practice of this invention.

Turing now to Figure 3, there is shown in detail a signal differentiating system which may be employed to produce short energy pulses required in the practice of this invention. It consists of a capacitance 15 and a resistance 17, the capacitance 15 being in series with the signal output, and the resistance 17 being the shunt across the output circuit.

A differentiator circuit produces an output voltage, the amplitude of which is proportional to the rate of change of the input voltage. In a capacity resistance differentiator circuit, the time constant is made short relative to the duration of the applied pulse, in order that the capacitor will become fully charged in a small fraction of the pulse duration. The charge on a capacitor cannot change in value instantaneously, but can change only at the rate established by the product of the resistance and capacity value. This is equivalent to the statement that any sudden change in the voltage of one terminal of a capacitor must occur simultaneously with an equal change in voltage at the other terminal. Since the two circuit components act as a voltage divider network, the portion of the applied voltage which does not appear across the capacitor because of the time required for a change of charge must appear across the resistor as an output voltage.

In order to provide energy pulses of one polarity, it is necessary to rectify or clip the output energy pulses of the differentiator. This is accomplished in diode 19. Diode 19 contains cathode 21 and anode 23. When, as a result of the applied energy pulses, cathode 21 becomes positive with respect to anode 23, no current will flow through diode 19. There will result, therefore, a potential across resistance 17 which will provide an energy pulse in the output circuit. When, however, the energy pulse applied to the diode 19 is in a negative direction and causes cathode 21 to become negative with respect to anode 23, diode 19 becomes conducting and provides a low impedance path across the output circuit so that no energy pulse will be produced across the resistor 17 during the occurrence of a pulse having a negative polarity.

It will be seen that the frequency of recurrence of the energy pulses will be dependent upon the frequency of the incoming signal wave.

Figure 4:
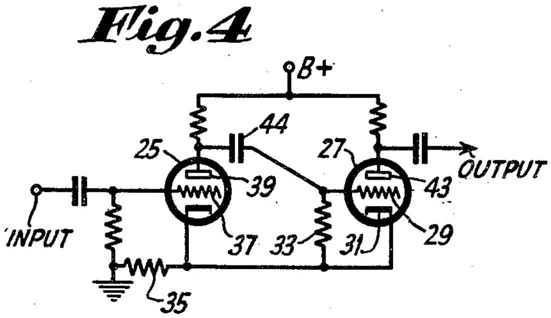
Figure 4 shows a trigger circuit which may be employed to produce energy pulses for the practice of one form of this invention.

Turning now to Figure 4, there is shown in detail a trigger circuit which may be employed to provide energy pulses of short duration, and whose frequency of recurrence is dependent upon the applied signal frequency.

Tubes 25 and 27 are combined in such a trigger circuit to provide what is sometimes known as a "one-shot" multivibrator. It is a modification of the Eccles-Jordan trigger circuit and accomplishes only one complete cycle with each positive pulse. It is essentially a two-stage resistance coupled amplifier with one tube cut off and the other normally conducting. The balanced condition of the circuit is established by properly biasing the tubes. The control electrode 29 of tube 27 is connected to its cathode 31 through the resistor 33. No current normally flows through this resistor 33, therefore the control electrode bias is normally zero. The anode current of tube 27 flows through the cathode resistor 35 and the resultant voltage drop across resistor 35 biases tube 25 to cut off. When tube 27 is not conducting, tube 25 cannot be cut off by the self-bias developed across resistor 35.

The action of the circuit is as follows: Tube 25 is cut off initially by the voltage drop produced across resistor 35 by the anode current of tube 27. Tube 27 is conducting heavily because its control electrode 29 is at cathode potential.

A positive pulse arriving at control electrode 37 raises the potential of control electrode 37 above the cut off voltage of tube 25, causing tube 25 to conduct, and the voltage at its anode 39 decreases. This decrease in potential passes through capacity 44. As the voltage across the capacitor 44 cannot be changed instantaneously, it appears on the control electrode 29 as a negative-going voltage. The negative-going voltage at control electrode 29 decreases the current flow in tube 27. The corresponding voltage drop in resistor 35 decreases, allowing more current to flow in tube 25. The anode voltage of tube 25 is still further decreased, causing the control electrode 29 to go still more negative.

The action described above is repeated until the tube 27 is cut off and tube 25 is conducting. This action is practically instantaneous.

The circuit remains with tube 25 conducting and tube 27 cut off until condenser 44 discharges sufficiently toward the lowered value of anode voltage of tube 25 to allow the control electrode 29 to rise from its lowest value to cut-off voltage. Then tube 27 begins to conduct.

The anode current of tube 27 flowing through resistor 35 raises the cathode voltage of tube 25 and thus reduces its anode current. The decreased anode current of tube 25 allows the anode voltage of tube 25 to increase. This increase is coupled to control electrode 29, increasing still further the anode current of tube 27. Such action is continued until tube 25 is cut off and tube 27 is conducting heavily. This action, after tube 27 begins to conduct, is practically instantaneous.

The circuit is now back in its original balanced state and will remain so until another positive pulse arrives and causes tube 25 to conduct.

The length of the time interval during which the potential of anode 39 of tube 25 is low and the potential of anode 43 of tube 27 is high is controlled by the time constant of capacity 44 and resistor 33. If small values of resistance and capacity are used, the length of the time interval is small.

Thus far in the discussion, the trigger circuit has been considered as symmetrical or balanced, that is, with each pair of corresponding components equally matched. It is desirable to obtain energy pulses of short duration with a relatively long period of time between pulses. To accomplish this, the time constant in the control electrode circuit of tube 25 is made long with respect to the time constant of the control electrode circuit of tube 27, so that tube 27 may remain cut off for only a small portion of the cycle.

If, for example, resistor 33 is made relatively small, condenser 44 discharges quickly toward the lower value of anode voltage of tube 25 to allow the potential of control electrode 29 to rise from its lowest value to cut off voltage. Tube 27 will therefore begin to conduct a relatively short interval after the input signal pulse. Such action results in a short energy pulse in the output circuit.

Figure 5:
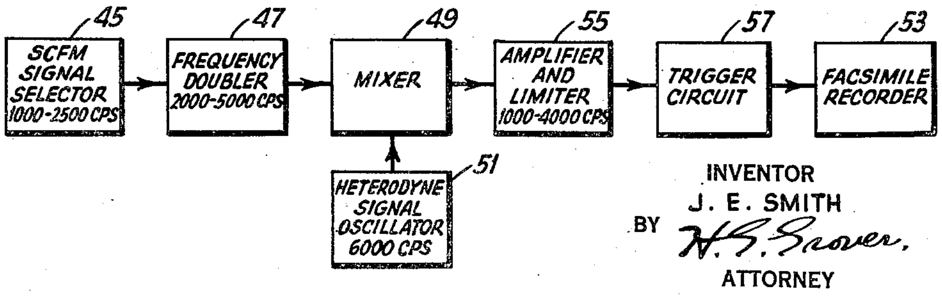
Figure 5 shows in block diagram another preferred form of this invention.

Figure 5 illustrates another form of this invention. On a long distance radio circuit, it may not be feasible to shift the audio sub-carrier as much as 4 to 1 due to the distortion caused by selective fading. In order to obtain a complete recording range on the photographic paper in such instances, it will be necessary to multiply the range of frequency shift at the receiving terminal. This can be done by the combined use of multiplying and heterodyning circuits. For example, if the incoming wave shifts from 1000 to 2500 cycles for white and black, its frequency can be doubled such that the subcarrier frequency will shift from 2000 to 5000 cycles. The frequency shift of 2000 to 5000 cycles may then be heterodyned down by 1000 cycles to result in a frequency shift from 1000 to 4000 cycles to give the desired recording range.

In Figure 5, the SCFM signal selector 45 passes a signal of, for example, 1000 to 2500 cycles per second to a frequency doubler 47. The frequency doubler 47 will produce a signal having a frequency range of 2000 to 5000 cycles per second.

Any frequency doubler may be used. A frequency doubler of a suitable type is shown and described on page 149 of the article referred to above and contained in "RCA Review" for October 1939, entitled "Radio Facsimile by subcarrier frequency modulation," by R. E. Mathes and J. N. Whitaker.

The output signal from the frequency doubler 47 is passed to a mixer 49 which combines the signal output of the frequency doubler with a heterodyne signal oscillator 51 having a frequency of, for example, 6000 cycles per second. The mixer 49 and the oscillator 51 may be of any conventional type.

The resulting signal, having a frequency range of 1000 to 4000 cycles, is passed to the facsimile recorder 53 through the amplifier and limiter 55 and the trigger circuit 57.

The amplifier and limiter 55, the trigger circuit 57, and the facsimile recorder 53 may take the same form as the equipment utilized in the form of the invention illustrated in Figure 1.

Having thus described the invention, what is claimed is:

1. In a facsimile receiving system of the type employing a subcarrier frequency modulated signal for the transmission of intelligence signals, a frequency multiplier for said signal, a signal limiter connected to said frequency multiplier, means connected to said limiter and adapted to produce energy pulses whose frequency of recurrence is controlled by the frequency of said signal after multiplication and whose time duration is relatively short with respect to their time of recurrence, a heterodyne signal oscillator, a rectifier connected to said peaking circuit and said heterodyne signal oscillator to pass pulses of only one polarity, and a recorder connected to said rectifier, the response of said recorder being proportional to the frequency of recurrence of said pulses.

2. In a facsimile system of the type employing a subcarrier frequency modulated signal for the transmission of intelligence signals, a frequency multiplier for said signal, a heterodyne signal oscillator, a mixer circuit connected to said frequency multiplier and said heretodyne signal oscillator to combine said signal after its frequency has been multiplied with the heterodyning signal, a limiter connected to said mixer, means connected to said limiter and adapted to produce energy pulses whose frequency of recurrence is controlled by the frequency of said signal after its frequency has been multiplied and heterodyned and whose time duration is relatively short with respect to their time of recurrence, a rectifier connected to said peaking circuit to pass pulses of only one polarity, and a recorder connected to said rectifier, the response of said recorder being proportional to the frequency of recurrence of said pulses.

3. In a communication system of the type employing a frequency modulated signal for the transmission of intelligence, a signal receiver comprising a frequency multiplier for said frequency modulated signal, a heterodyne signal generator, a signal mixer connected to said frequency multiplier and said heterodyne signal generator to combine said frequency modulated signal after its frequency has been multiplied and the heterodyning signal to form an auxiliary signal, a pulse generator connected to said mixer to receive said auxiliary signal and to produce therefrom energy pulses whose frequency of recurrence is controlled by the frequency of said auxiliary signal and whose time of duration is relatively short with respect to their time of recurrence, and a signal translator connected to said energy pulse generator for converting said pulses into intelligence whose response is proportional to the frequency of recurrence of said pulses.

4. In a signal receiving system of the type employing a frequency modulated signal for the transmission of intelligence, a harmonic generator for said frequency modulated signal to generate a harmonic of said frequency modulated signal, a heterodyne signal generator, a signal mixer connected to said harmonic generator and said heterodyne signal generator to combine said harmonic of the frequency modulated signal and the heterodyning signal to form an auxiliary signal, an energy pulse generator connected to said mixer to receive said auxiliary signal and to produce therefrom energy pulses whose frequency of recurrence is controlled by the frequency of said auxiliary signal and whose time of duration is relatively short with respect to their time of recurrence, and a signal translator connected to said energy pulse generator for converting said pulses into intelligence whose response is proportional to the frequency of recurrence of said pulses.

5. In a communication system of the type employing a frequency modulated signal for the transmission of intelligence, a receiver comprising a frequency doubler for said frequency modulated signal, a heterodyne signal generator, a signal mixer connected to said frequency doubler and said heterodyne signal generator to combine said frequency modulated signal after its frequency has been doubled and the heterodyning signal to form an auxiliary signal, a pulse generator connected to said mixer to receive said auxiliary signal and to produce therefrom energy pulses whose frequency of recurrence is controlled by the frequency of said auxiliary signal and whose time of duration is relatively short with respect to their time of recurrence, and a signal translator connected to said energy pulse generator for converting said pulses into intelligence whose response is proportional to the frequency of recurrence of said pulses.

6. In a communication receiving system of the type employing a frequency modulated signal for the transmission of intelligence, a frequency multiplier for said frequency modulated signal, a heterodyne signal generator, a signal mixer connected to said frequency multiplier and said heterodyne signal generator to combine said frequency modulated signal after its frequency has been multiplied and the heterodyning signal to form an auxiliary signal, and an energy pulse generator connected to said mixer to receive said auxiliary signal and to produce therefrom energy pulses whose frequency of recurrence is controlled by the frequency of said auxiliary signal and whose time of duration is relatively short with respect to their time of recurrence.

JAMES ERNEST SMITH.

REFERENCES CITED

The following references are of record in the file of this patent:

UNITED STATES PATENTS

| Number | Name | Date |
|---|---|---|
| 1,790,722 | Ranger | Feb. 3, 1931 |
| 1,790,723 | Ranger | Feb. 3, 1931 |
| 1,848,840 | Ranger | Mar. 8, 1932 |
| 2,060,778 | Finch | Nov. 10, 1936 |
| 2,113,214 | Luck | Apr. 5, 1938 |
| 2,136,340 | Hardy | Nov. 8, 1938 |
| 2,257,282 | Smith | Sept. 30, 1941 |
| 2,263,986 | Finch | Nov. 25, 1941 |
| 2,269,594 | Mathes | Jan. 13, 1942 |
| 2,290,229 | Finch | July 21, 1942 |
| 2,350,051 | Lubeck | May 30, 1944 |
| 2,392,546 | Peterson | Jan. 8, 1946 |
| 2,444,479 | Trevor | July 6, 1948 |